United States Patent [19]
Gualtieri et al.

[11] Patent Number: 5,289,720
[45] Date of Patent: Mar. 1, 1994

[54] OPTIC SENSOR FOR DETERMINING ENVIRONMENTAL CONDITIONS

[75] Inventors: Devlin Gualtieri, Ledgewood; Herman VandeVaart, Washington Township, both of N.J.; Stephen M. Emo, Elkhart, Ind.; Janpu Hou, Bridgewater, N.J.

[73] Assignee: Allied-Signal Inc., Morristown, N.J.

[21] Appl. No.: 915,443

[22] Filed: Jul. 17, 1992

[51] Int. Cl.$^5$ .............................. G01L 9/00
[52] U.S. Cl. ...................... 73/705; 73/708; 250/231.19
[58] Field of Search .......... 73/705, 708; 374/161, 374/162; 250/227.17, 231.19; 324/96

[56] References Cited

U.S. PATENT DOCUMENTS

| 3,950,987 | 4/1976 | Slezinger et al. | 73/705 |
| 4,367,040 | 1/1983 | Goto | 250/231.19 |
| 4,495,411 | 1/1985 | Rashleigh | 250/227.17 |
| 4,495,819 | 1/1985 | Tekippe | 73/705 |
| 4,757,195 | 7/1988 | Katagiri | 250/231.19 |
| 4,932,263 | 6/1990 | Wlodarczyk | 73/705 |
| 5,187,983 | 2/1993 | Bock et al. | 73/705 |

Primary Examiner—Richard E. Chilcot, Jr.
Assistant Examiner—William L. Oen
Attorney, Agent, or Firm—Leo H. McCormick, Jr.; Larry J. Palguta; Robert A. Walsh

[57] ABSTRACT

A sensor for use in an optic system to detect current conditions in an environment. The sensor has a crystal member with a first waveguide extending from a top surface and a second waveguide extending from a bottom surface of a core member. Polarized light waves from a source are simultaneously communicated to the first and second waveguides. A first pressure is communicated to the top surface of the crystal member and an unknown pressure corresponding to the pressure of the environment is communicated to the bottom surface of the crystal member. The first pressure and the unknown pressure develop a pressure differential which acts on the crystal member to deform the first and second waveguides. The deformation of the first and second waveguides modifies the polarized light waves to create first and second output waves which are communicated to an optical interface where differences therebetween are extracted. The differences are analyzed by a computer to identify the current pressure and temperature of the environment.

4 Claims, 2 Drawing Sheets

OPTIC SENSOR FOR DETERMINING ENVIRONMENTAL CONDITIONS

This invention relates to a sensor for use in an optic system to detect conditions in an environment. The sensor has a crystal member with a substrate which has first and second waveguides extending therefrom. A source of polarized light waves is simultaneously presented to the first and second waveguides. A pressure differential developed from a first pressure and a different second pressure of the environment acts on the crystal member to deform the first and second waveguides. The deformation of the first and second waveguides modifies the polarized light waves to create first and second output waves. After the fundamental frequency of the first and second output waves are defined, an analyzer extracts the difference in frequency and phase there between to provide an input to a computer where the frequency and phase difference is compared with a reference frequency and phase to define the current pressure and temperature of the environment.

The conditions of an environment have been measured through the use of a plurality of sensors which communicate information in the form of electrical signals to an indicator through bundles of copper wires. However, these bundles need to be shielded from extraneous forces which can modify the electrical signals of the sensors. Recently various optic sensors, which are immune to electromagnetic interference, such as disclosed in U.S. Pat. No. 4,598,996 and U.S. patent application Ser. No. 796,743 filed Nov. 25, 1991 have been developed which use light carried on glass fibers to prevent extraneous forces from affecting output of the sensors. In these sensors, modification of the light wave pattern carried by the glass fibers are analyzed to detect the temperature of an environment; more specifically, a fringe pattern associated with light waves passing through birefringent crystals is decoded to determine the temperature in an environment. These sensors adequately detect temperature when used in an intended environment.

In evaluating the optic sensor disclosed in U.S. patent application Ser. No. 796,743 it was observed that the velocity of light waves propagating through a birefringent crystal could be shifted by an application of pressure to the crystal.

In the present invention, we have developed a sensor for use in an optic system having the capability of determining both pressure and temperature in a environment. The sensor has a crystal member made from a yttrium aluminum garnet substrate with epitaxial layers of holmium aluminum garnet located on the top and bottom surfaces thereof. The layers of holmium aluminum garnet form first and second waveguides which simultaneously receive polarized light waves from a source. A housing which supports the crystal member has a first chamber in communication with a first pressure and a second chamber in communication with an unknown pressure corresponding to the current pressure in the environment. The first pressure and unknown pressure develop a pressure differential which acts on the crystal member to produce a force which deforms the first and second waveguides. The deformation of the first and second waveguides correspondingly modify the polarized light waves to create first output waves in the first waveguide and second output waves in the second waveguide. The first and second output waves which are communicated to an optical interface member are analyzed to determine first and second fundamental frequencies and phase of the first and second output waves. The differences between the fundamental frequencies and phases of the fringe patterns of the first and second output waves indicate the pressure of the environment while the mean frequency and phase indicates the temperature of the environment.

It is an object of this invention to provide an optical system with a crystal member having integral first and second waveguides which simultaneously receive polarized light waves from a source, whereby the crystal member is responsive to a stress caused by changes in the pressure of an environment which modify the polarized light waves to provide a detector and computing element with a signal from which current pressure of the environment is derived.

It is an object of this invention to provide a sensor wherein the difference between the frequency and/or phase of the fringe pattern of light waves passing through first and second waveguides is used to indicate the pressure in an environment while the mean of the frequency and/or phase of the fringe pattern of light waves passing through first and second waveguides is used to indicate the temperature of the environment.

It is a further object of this invention to provide a system for measuring the pressure and temperature in an environment by analyzing output light waves derived from polarized light simultaneously presented to first and second waveguides of a birefringent crystal.

These objects and other advantages should be apparent from reading this specification while viewing the drawings wherein:

FIG. 1 is a schematic illustration of an optic system having a sensor member made according to the present invention wherein a pressure differential acts on a crystal to deform first and second waveguides and modify first and second polarized light waves by birefringence to produce first and second output waves, the resulting differences of the frequency and/or phase of the fringe patterns of the first and second output waves indicate the pressure of the environment while the mean of the frequency and/or phase of the fringe patterns of the first and second output waves indicate the temperature of the environment;

Figures 1A, 1B:
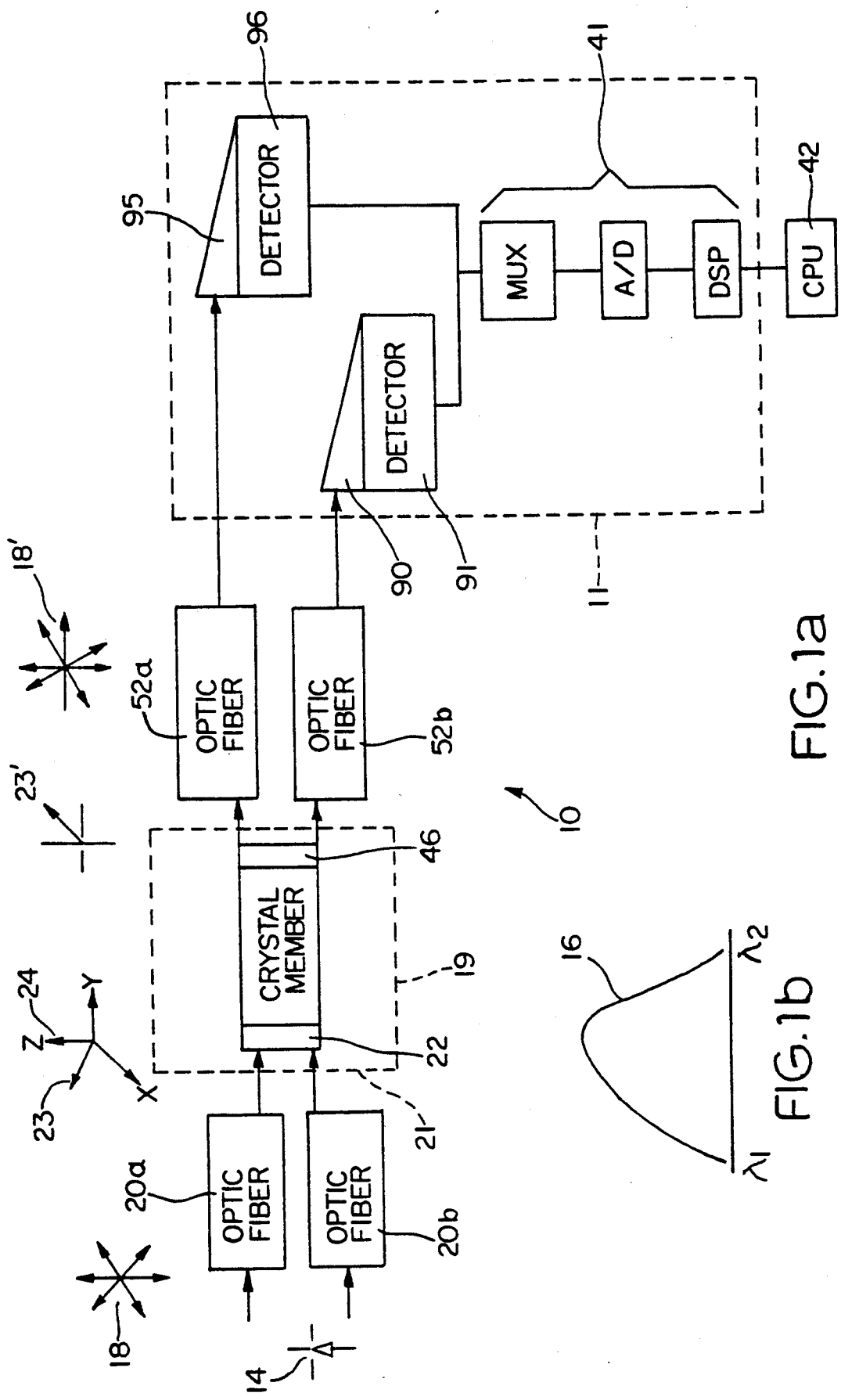
Figure 2:
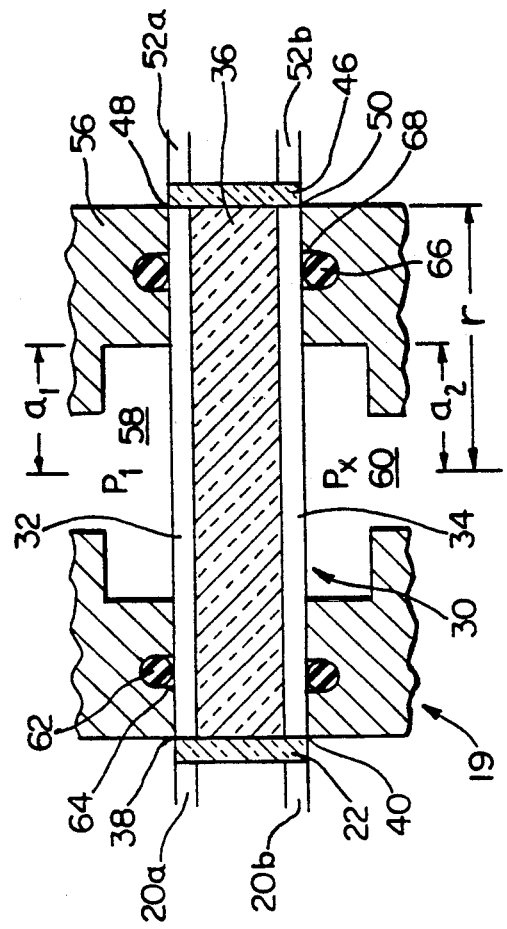
FIG. 2 is a sectional view of the crystal and waveguides of the sensor member of FIG. 1.

The optic system 10, shown in FIG. 1, includes a sensor 19, illustrated in FIG. 2, which generates first and second optical signals which are processed in an opto-electronic interface 11 to extract a fundamental frequency and/or phase which are analyzed in a central processing unit (CPU) 42 to indicate the current pressure and temperature of an environment in which the sensor 19 is located.

Figure 6:
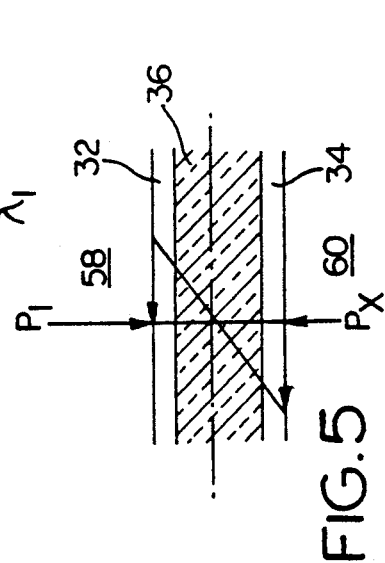
FIG. 6 is a curve which represents the spectrum of the first and second output waves.

The optic system 10 shown in FIG. 1 utilizes a broad band light spectrum, such as illustrated by curve 16, generated by source 14, such as a light emitting diode. The broad band light spectrum, which is randomly polarized as depicted by 18, is transmitted through fiber optic cables $20_a$ and $20_b$ to entrance connector 21 of sensor 19. The randomly polarized light presented to the connector 21 is communicated to a linear polarizer 22 in sensor 19. After passing through the linear polarizer 22, the light spectrum has a single plane of polarization, as depicted by 23. The linear polarizer 22 is connected to crystal member 30 to simultaneously present identical polarized light waves to a first entrance face 38 of a first waveguide 32 and a second entrance face 40 of a second waveguide 34. As the polarized light waves pass through the first 32 and second 34 waveguides, the first and second output waves are modulated and after passing through first 48 and second 50 exit faces are communicated to a second linear polarizer 46. The second linear polarizer 46 analyzes the first and second output light waves as depicted by 18' into first 116 and second 116' light spectrums shown in FIG. 6. The first 116 and second 116' light spectrums are carried by optic cables $52_a$ and $52_b$ to the opto-electronic interface 11 where prisms 90 and 95 direct the first 116 and second 116' light spectrums onto a lens grating assembly for focusing onto an array of photodetectors or a charge coupled detector device 91 and 96. The output of the detector devices 91 and 96 are presented to conditioning electronics 41 including a MUX, A/D, and DSP, where separate serial voltage streams are generated for the first 116 and second 116' light spectrums. The serial voltage streams are analyzed in the conditioning electronics 41 where the frequency and phase difference between the streams and mean frequency and/or phase are determined to indicate the current pressure and temperature in the environment wherein sensor 19 is located and communicated to a host CPU 42. The accuracy of the information extracted from the first 116 and second 116' light spectrums by the CPU 42 is dependent on the sensor 19, the particular structure of crystal member 30 and the design of the opto-electronic interface 11.

The sensor 19, as shown in FIG. 2, includes a housing 56 which retains the first 22 and second 46 linear polarizers, crystal member 30 and inter connecting optic fibers $20_a$, $20_b$, $52_a$ and $52_b$. The housing 56 has a cavity therein which is divided into a first chamber 58 and a second chamber 60 by the crystal member 30. A first seal 62 located in a groove 64 of housing 56 engages the first waveguide 32 and a second seal 66 located in groove 68 which prevents fluid communication between chambers 58 and 60. The crystal member 30 of sensor 19 can be considered as a diaphragm rigidly supported and selectively displaced by a pressure differential between chambers 58 and 60. The first 32 and second 34 waveguides associated with crystal member 30 are subjected to the same bending stress induced on crystal member 30 by the pressure differential and being located on opposite sides or the top and bottom of core 36 function as beams. Thus, the magnitude of stress will be the same but of opposite signs, that is one waveguide will be in tension while the other waveguide will be in compression, as shown in FIG. 5.

Figure 3:
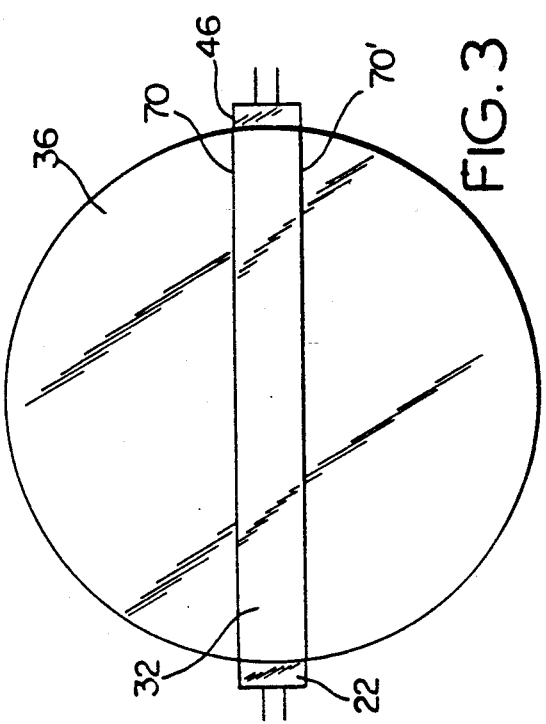
FIG. 3 is a top view of the crystal of FIG. 2.
Figure 4:
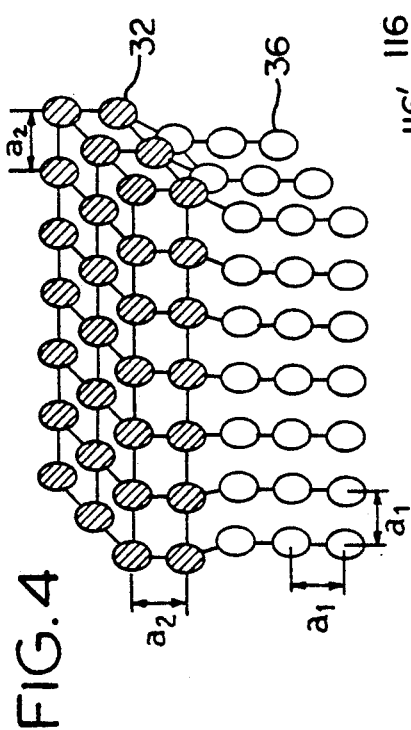
FIG. 4 is an illustration of a segment of the lattice structure of the crystal and waveguides.

In more detail, crystal member 30 is made up of core member 36 with first 32 and second 34 waveguides attached thereto, see FIG. 2 and 3. The core 36 is made of yttrium aluminum garnet ($Y_3Al_5O_{12}$) which has a lattice constant $a_1$ while the first 32 and second 34 waveguides are made of holmium aluminum garnet ($Ho_3Al_5O_{12}$) which has a different uniform lattice constant $a_2$, as shown in FIG. 4. The difference or mismatch of the lattice constants creates a strain which in turn results in a stress. The stress is defined by E, Youngs Modulus, and the induced strain. The stress can be calculated by the following equation $\sigma = E\epsilon$, where (strain) $\epsilon = (a_2 - a_1)/a_1$. The strain in the first 32 and second 34 waveguides has been calculated and measured to be about 0.032%. This inherent stress induces birefringence into the first 32 and second 34 waveguides. It is this stress-induced birefringence that causes the fringe pattern shown in FIG. 6 and it is the change in the fringe pattern as a function of pressure and temperature that is used to measure the pressure and temperature of the environment. For ease in manufacture, the first 32 and second 34 waveguides completely cover the core 36, however for some applications it may be desirable to limit the width "w" as shown by lines 70 and 70', shown in FIG. 3, and clad the first 32 and second 34 waveguides in the core member 36. It is anticipated that the first 32 and 34 waveguides could also be made from other materials which also have a functional equivalent lattice structure such as: $(Tb,Lu)_3Al_5O_{12}$; $(Tb,Yb)_3Al_5O_{12}$; $(Tb,Tm)_3Al_5O_{12}$; $(Tb,Er)_3Al_5O_{12}$; $(Tb,Er)_3Al_5O_{12}$; $(Dy,Lu)_3Al_5O_{12}$; $(Dy,Yb)_3Al_5O_{12}$; $(DY,Tm)_3Al_5O_{12}$; $(Dy,Er)_3Al_5O_{12}$; $(Gd,Lu)_3Al_5O_{12}$; $(Gd,Yb)_3Al_5O_{12}$; $(Gd,Tm)_3Al_5O_{12}$; $(Gd\ Er)_3Al_5O_{12}$; $(Y,Lu)_3(Sc,Al)_5O_{12}$; $(Y,Yb)_3(Sc,Al)_5O_{12}$; $(Y,Tm)_3(Sc,Al)_5O_{12}$; $(Y,Er)_3(Sc,Al)_5O_{12}$; $(Dy,Lu)_3(Sc,Al)_5O_{12}$; $(Dy,Yb)_3(Sc,Al)_5O_{12}$; $(Dy,Tm)_3(Sc,Al)_5O_{12}$; $(Dy,Er)_3(Sc,Al)_5O_{12}$; $(Tb,Lu)_3(Sc,Al)_5O_{12}$; $(Tb,Yb)_3(Sc,Al)_5O_{12}$; $(Tb,Lm)_3(Sc,Al)_5O_{12}$; $(Tb,Er)_3(Sc,Al)_5O_{12}$; $(Gd,Lu)_3(Sc,Al)_5O_{12}$; $(Gd,Yb)_3(Sc,Al)_5O_{12}$; $(Gd,Tm)_3(Sc,Al)_5O_{12}$; $(Gd,Er)_3(Sc,Al)_5O_{12}$; $(Ca,Tb)_3(Si,Al)_5O_{12}$; $(Ca,Dy)_3(Si,Al)_5O_{12}$; $(Ca,Gd)_3(Si,Al)_5O_{12}$; $(Ca,Y)_3(Si,Sc,Al)_5O_{12}$; $(Ca,Dy)_3(Si,Sc,Al)_5O_{12}$; $(Ca,Tb)_3(Si,Sc,Al)_5O_{12}$; $(Ca,Gd)_3(Si,Sc,Al)_5O_{12}$; $(Ca,Lu)_3(Ge,Al)_5O_{12}$; $(Ca,Yb)_3(Ge,Al)_5O_{12}$; $(Ca,Tm)_3(Ge,Al)_5O_{12}$; and $(Ca,Er)_3(Ge,Al)_5O_{12}$.

Figure 5:
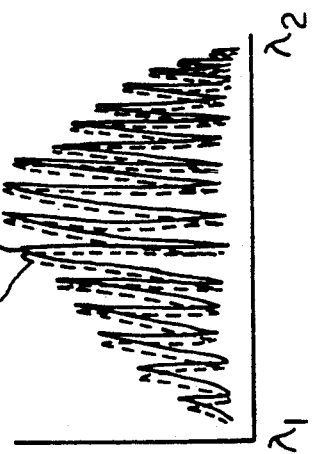
FIG. 5 is a stress diagram resulting from a pressure differential imposed on the crystal and waveguides.

The pressure differential that develops across crystal member 30 acts on, deforms and places a stress on the first 32 and second 34 waveguides in a manner as illustrated by the force diagram shown in FIG. 5. Assuming the a first pressure ($P_1$), for instance atmospheric pressure, is communicated to chamber 58 and an unknown pressure ($P_x$) is presented to chamber 60, then the resulting pressure differential ($P_1 - P_x$) acts on the crystal member 30 to cause a contraction on the top surface and an expansion on the bottom surface which theoretically decreases the length of the top waveguide 32 and increases the length of the bottom waveguide 34. In practice these length changes are negligible and can be disregarded. More importantly, the tangential stress that is introduced into crystal member 30 varies as a function of the unknown pressure ($P_x$) and can be expressed according to the following equation:

$$G_T = \frac{3P_2}{4t^3}[(1+\nu)a^2 - (1-3\nu)r^2] \quad (1).$$

where:
$P = P_1 - P_x$;
$z = t/2$;
$t$ = thickness of crystal member;
$\nu$ = Poisson's Ratio;
$a$ = radius of pressure area; and
$r$ = radius of the crystal.

The stress induced into the first 32 and second 34 waveguides has an effect on the fringe pattern of the first 116 and second 116' light spectrums which can be expressed as follows:

$$I = I_{o\lambda} \sin^2\left[\frac{\pi}{\lambda} l \left(B_o + \frac{dB}{d\sigma}\sigma + \frac{dB}{dT}T\right)\right]$$

Where:
 $I_o$ = Initial (Excitation) Intensity
 $\lambda$ = wavelength;
 $B_o$ = birefringence at $\sigma=0$ and $T=0$.
 $dB/d\sigma$ = stress dependence of the birefringence;
 $dB/dT$ = temperature dependence of the birefringence;
 $\lambda$ = optical path length = $2r$; and
 $T$ = temperature of the crystal member.

The operation of the optic system 10 with a sensor 19 located in an environment where conditions are to be monitored and connected to the opto-electronic interface 11 by optic fibers $52_a$ and $52_b$ is as follows: The broad band light spectrum from source 14 is communicated through fiber optic cables $20_a$ and $20_b$ to sensor 19 where the light waves are polarized and simultaneously communicated to the first 38 and second 40 entrance faces of the first 32 and second 34 waveguides. The unknown pressure $P_x$ in the environment is communicated to chamber 60 and creates a pressure differential with the Pressure $P_1$ in chamber 58. This pressure differential acts on the first 32 and second 34 waveguides to modify the light waves as they pass through the waveguides to create first and second output light waves that are communicated from the first 48 and second 50 exit faces to polarizer 46 and thereafter carried by optic cables $52_a$ and $52_b$ to the opto-electronic interface 11. The first and second output light waves are subjected to the same conditions of the environment by the bending stress induced on the first 32 and second 34 waveguides except one is positive and the other is negative. The output light waves are decomposed into their spectral components which are focused onto the array of linear photodetectors or CCD array(s) 91 and 96 and converted into separate first and second serial voltage streams. A critical function of the opto-electronic interface 11 is that each of the first and second output light waves must be read at the same time to develop meaningful information. If the first and second lightwaves are not read over the same interval of time the reading could be corrupted by dynamic changes in the differential pressure. The first and second serial voltage streams are converted into a digital format by the conditioning electronics 41 where a time domain to frequency domain transformation is performed to determine the fundamental frequency of the first and second serial voltage streams and difference in the relative phase at those frequencies, this type function is generically referred to as a Fast Fourier Transformation. Thereafter, the difference between the fundamental frequencies and difference in the phase are determined. These differences in fundamental frequencies and phase represent twice the stress in the first 32 and second 34 waveguides caused by the difference between the unknown pressure $P_x$ and the reference pressure $P_1$. With the stress difference caused by pressure $P_x$ now known it can be substituted into equation (2) and solved for the current temperature of the environment.

We claim:

1. A sensor system for use in an optic system to detect current conditions of an environment, said sensor system being characterized by:

a crystal member having a substrate with a top surface and a bottom surface, a first waveguide extending from said top surface having a first entrance face and a first exit face and a second waveguide extending from said bottom surface having a second entrance face and a second exit face;

support means for engaging said crystal member to define a first chamber in communication with said top surface and a second chamber in communication with said bottom surface; means for communicating polarized light waves from source to said first and second entrance faces of said first and second waveguides, respectively;

first means for communicating a first pressure to said first chamber; and second means for communicating an unknown pressure corresponding to the pressure of the environment to said second chamber to develop a pressure differential with said first pressure in said first chamber, said pressure differential acting on said top and bottom surfaces of said crystal member to produce a force which deforms said first and second waveguides, said polarized light waves being correspondingly modified by the deformation of said first and second waveguides to create first output waves in said first waveguide and second output waves in said second waveguide, said first and second output waves having first and second fringe patterns; and means for communicating said first output waves from said first exit face and said second output waves from said second exit face to an optical interface;

an array of linear photodetector for converting said first and second fringe patterns into corresponding first and second serial voltage streams;

processor means for determining first and second fundamental frequencies and relative phases and the mean frequency and phase said first and second serial voltage streams, said processor means determining differences between the fundamental frequencies and phase of said first and second fringe patterns; and comparator means for comparing said differences in said first and second serial voltage streams, said differences corresponding to said unknown pressure in said environment, said comparator comparing said mean frequency and phase with a reference to obtain said current temperature of said environment.

2. The sensor system as recited in claim 1 wherein said means for communicating said polarized light from said source includes:

a source of broad band light spectrum;
a first optic cable for communicating said broad band light spectrum to a linear polarizing element to produce said polarized light waves.

3. The sensor system as recited in claim 2 wherein said core member of said crystal member is characterized by being made $Y_3Al_5O_{12}$ and said first and second waveguides are characterized by being made of a material selected from a group consisting of $Ho_3Al_5O_{12}$; $(Tb,Lu)_3Al_5O_{12}$; $(Tb,Yb)_3Al_5O_{12}$; $(Tb,Tm)_3Al_5O_{12}$; $(Tb,Er)_3Al_5O_{12}$; $(Tb,Er)_3Al_5O_{12}$; $(Dy,Lu)_3Al_5O_{12}$; $(Dy,Yb)_3Al_5O_{12}$; $(Dy,Tm)_3Al_5O_{12}$; $(Dy,Er)_3Al_5O_{12}$; $(Gd,Lu)_3Al_5O_{12}$; $(Gd,Yb)_3Al_5O_{12}$; $(Gd,Tm)_3Al_5O_{12}$; $(Gd,Er)_3Al_5O_{12}$; $(Y,Lu)_3(Sc,Al)_5O_{12}$; $(Y,Yb)_3(Sc,Al)_5O_{12}$; $(Y,Tm)_3(Sc,Al)_5O_{12}$; $(Y,Er)_3(Sc,Al)_5O_{12}$; $(Dy,$ Lu)$_3$(Sc,Al)$_5$O$_{12}$; (Dy,Yb)$_3$(Sc,Al)$_5$O$_{12}$; (Dy,Tm)$_3$(Sc,Al)$_5$O$_{12}$; (Dy,Er)$_3$(Sc,Al)$_5$O$_{12}$; (Tb,Lu)$_3$(Sc,Al)$_5$O$_{12}$; (Tb,Yb)$_3$(Sc,Al)$_5$O$_{12}$; (Tb,Lm)$_3$(Sc,Al)$_5$O$_{12}$; (Tb,Er)$_3$(Sc,Al)$_5$O$_{12}$; (Gd,Lu)$_3$(Sc,Al)$_5$O$_{12}$; (Gd,Yb)$_3$(Sc,Al)$_5$O$_{12}$; (Gd,Tm)$_3$(Sc,Al)$_5$O$_{12}$; (Gd,Er)$_3$(Sc,Al)$_5$O$_{12}$; (Ca,Tb)$_3$(Si,Al)$_5$O$_{12}$; (Ca,Dy)$_3$(Si,Al)$_5$O$_{12}$; (Ca,Gd)$_3$(Si,Al)$_5$O$_{12}$; (Ca,Y)$_3$(Si,Sc,Al)$_5$O$_{12}$; (Ca,Dy)$_3$(Si,Sc,Al)$_5$O$_{12}$; (Ca,Tb)$_3$(Si,Sc,Al)$_5$O$_{12}$; (Ca,Gd)$_3$(Si,Sc,Al)$_5$O$_{12}$; (Ca,Lu)$_3$(Ge,Al)$_5$O$_{12}$; *(Ca,Yb)*$_3$(Ge,Al)$_5$O$_{12}$; (Ca,Tm)$_3$(Ge,Al)$_5$O$_{12}$; and (Ca,Er)$_3$(Ge,Al)$_5$O$_{12}$.

4. The sensor system as recited in claim 3 wherein said core member and first and second waveguides of said crystal member have a structural lattice difference which creates an initial birefringence of approximately $1 \times 10^{-3}$ at the wavelength of operation.

* * * * *